(12) United States Patent
Hashimoto et al.

(10) Patent No.: US 12,397,669 B2
(45) Date of Patent: Aug. 26, 2025

(54) CONTROL DEVICE AND WIRELESS POWER TRANSMISSION SYSTEM

(71) Applicant: TOYOTA JIDOSHA KABUSHIKI KAISHA, Toyota (JP)

(72) Inventors: Toshiya Hashimoto, Miyoshi (JP); Masato Maemura, Nisshin (JP); Ryosuke Ikemura, Susono (JP); Shogo Tsuge, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 25 days.

(21) Appl. No.: 18/392,295

(22) Filed: Dec. 21, 2023

(65) Prior Publication Data

US 2024/0300355 A1 Sep. 12, 2024

(30) Foreign Application Priority Data

Mar. 9, 2023 (JP) ................................. 2023-036595

(51) Int. Cl.
| | |
|---|---|
| *B60L 53/36* | (2019.01) |
| *B60L 53/12* | (2019.01) |
| *B60L 53/30* | (2019.01) |
| *B60L 53/38* | (2019.01) |
| *H02J 50/90* | (2016.01) |

(52) U.S. Cl.
CPC ............... *B60L 53/36* (2019.02); *B60L 53/12* (2019.02); *B60L 53/32* (2019.02); *B60L 53/38* (2019.02); *H02J 50/90* (2016.02)

(58) Field of Classification Search
CPC .......... B60L 53/36; B60L 53/12; B60L 53/38; B60L 53/126; B60L 53/39; H02J 50/10; H02J 50/90
See application file for complete search history.

(56) References Cited

U.S. PATENT DOCUMENTS

2014/0257614 A1* 9/2014 Niizuma ................. B60L 53/14
  307/104
2017/0136907 A1* 5/2017 Ricci ..................... B60M 7/003

FOREIGN PATENT DOCUMENTS

JP 2021-100310 A 7/2021

\* cited by examiner

*Primary Examiner* — Rexford N Barnie
*Assistant Examiner* — Rasem Mourad
(74) *Attorney, Agent, or Firm* — SoraIP, Inc.

(57) ABSTRACT

The control device includes a processor that is configured to, in a wireless power transmission system that transmits, in a noncontact manner, power from a primary coil included in a supply facility to a secondary coil included in a vehicle that is traveling, output information for changing a traveling position in a width direction of the vehicle, and correct the traveling position in the width direction according to a change in the power transmission state when changing the traveling position in the width direction.

8 Claims, 9 Drawing Sheets

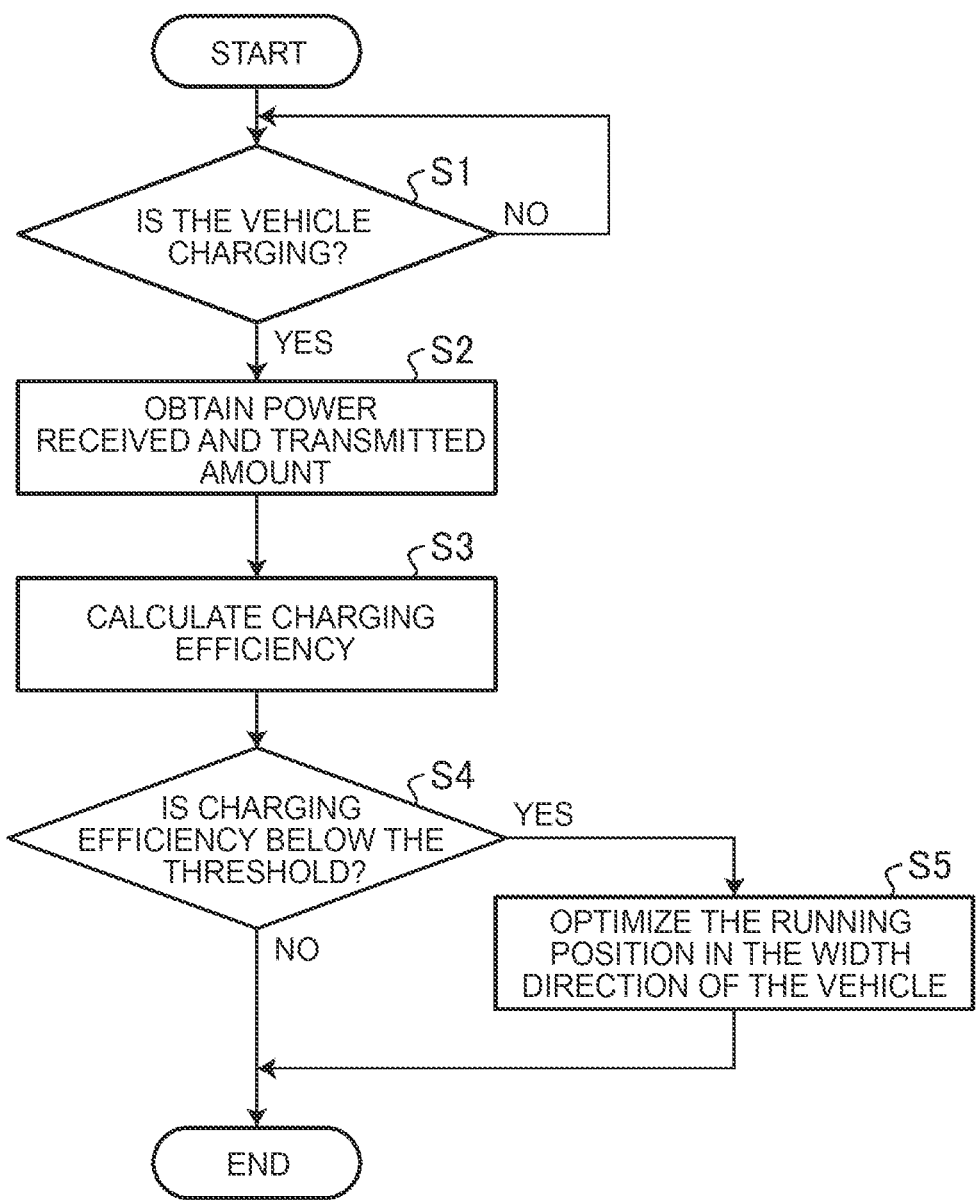

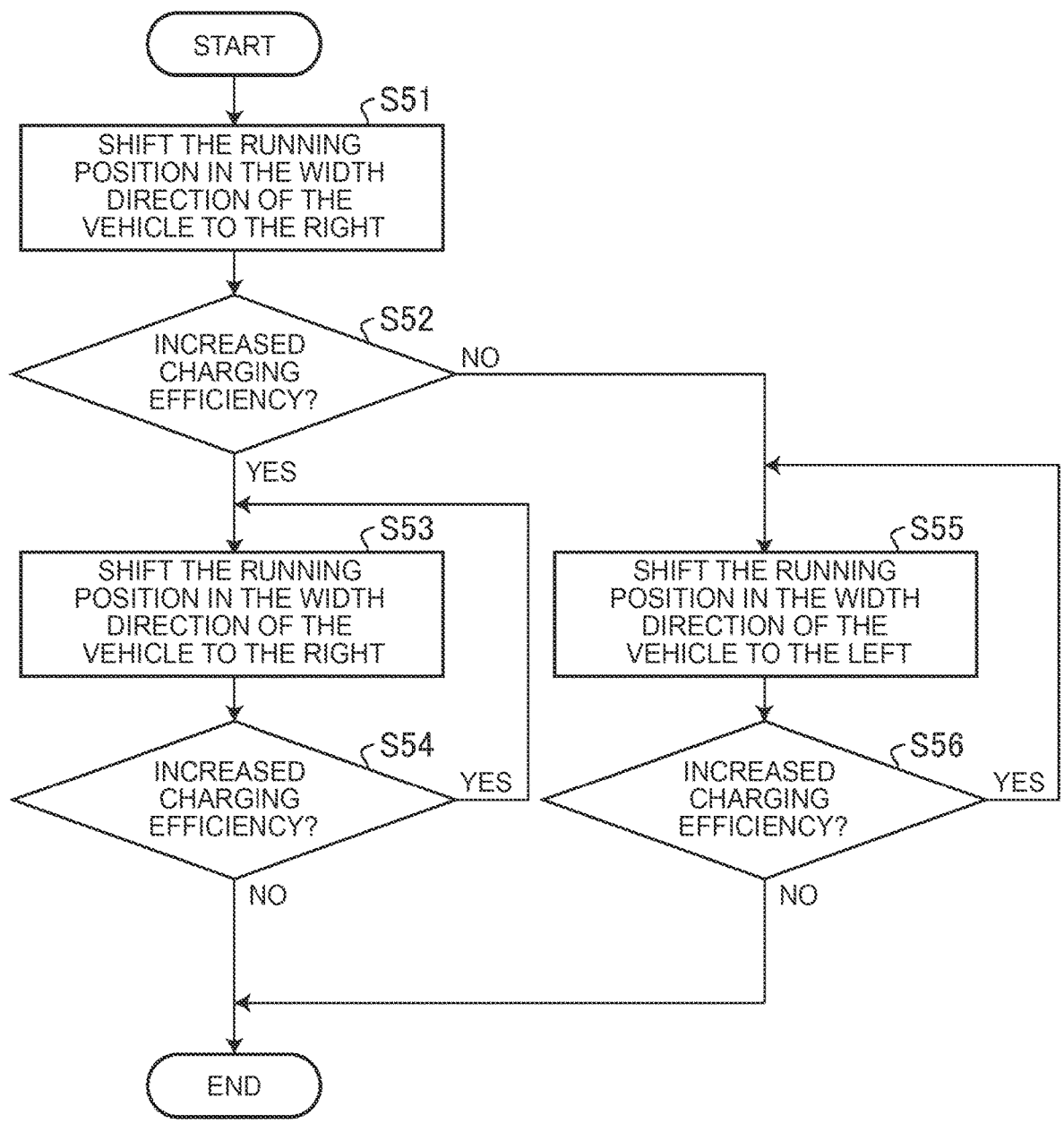

CONTROL DEVICE AND WIRELESS POWER TRANSMISSION SYSTEM

CROSS-REFERENCE TO RELATED APPLICATION

This application claims priority to Japanese Patent Application No. 2023-036595 filed on Mar. 9, 2023, incorporated herein by reference in its entirety.

BACKGROUND

1. Technical Field

The present disclosure relates to a control device and a wireless power transmission system.

2. Description of Related Art

Japanese Unexamined Patent Application Publication No. 2021-100310 (JP 2021-100310 A) describes a technique for measuring the amount of power received by a power receiving coil and performing alignment so that the measured amount of power received is improved when transmitting power in a noncontact manner to the power receiving coil mounted on a vehicle from a power transmitting coil installed outside the vehicle, and improving the measured amount of power received.

SUMMARY

However, when the charging efficiency characteristics of a primary coil (power transmitting coil) and a secondary coil (power receiving coil) in the vehicle width direction are symmetrical, it is impossible to improve the amount of power received unless it is known toward which of the right side or left side the relative position of the primary coil and the secondary coil is misaligned.

The present disclosure has been made in view of the above, and it is an object of the present disclosure to provide a control device and a wireless power transmission system that can correct a traveling position in the width direction of a vehicle even when the charging efficiency characteristics of a primary coil and a secondary coil in the width direction are symmetrical.

The control device according to the present disclosure includes a processor that is configured to,
  in a wireless power transmission system that transmits, in a noncontact manner, power from a primary coil included in a supply facility to a secondary coil included in a vehicle that is traveling,
  output information for changing a traveling position in a width direction of the vehicle, correct the traveling position in the width direction in accordance with a change in a state of transmission of the power when changing the traveling position in the width direction.

A wireless power transmission system according to the present disclosure includes:
  a supply facility including a primary coil that transmits, in a noncontact manner, power to a secondary coil included in a vehicle that is traveling; and
  a vehicle including the secondary coil, and
  a processor that outputs information for changing a traveling position in a width direction of the vehicle, and that is configured to correct the traveling position in the width direction in accordance with a change in a state of transmission of the power when changing the traveling position in the width direction.

According to the present disclosure, it is possible to correct a traveling position in the width direction of a vehicle even when the charging efficiency characteristics of a primary coil and a secondary coil in the width direction are symmetrical.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is a flowchart showing processing executed by the control device; and

FIG. 10 is a flowchart showing a process for optimizing the running position of the vehicle in the width direction.

DETAILED DESCRIPTION OF EMBODIMENTS

Hereinafter, a control device and a wireless power transmission system according to an embodiment of the present disclosure will be specifically described. The present disclosure is not limited to the embodiments described below.

Figure 1:
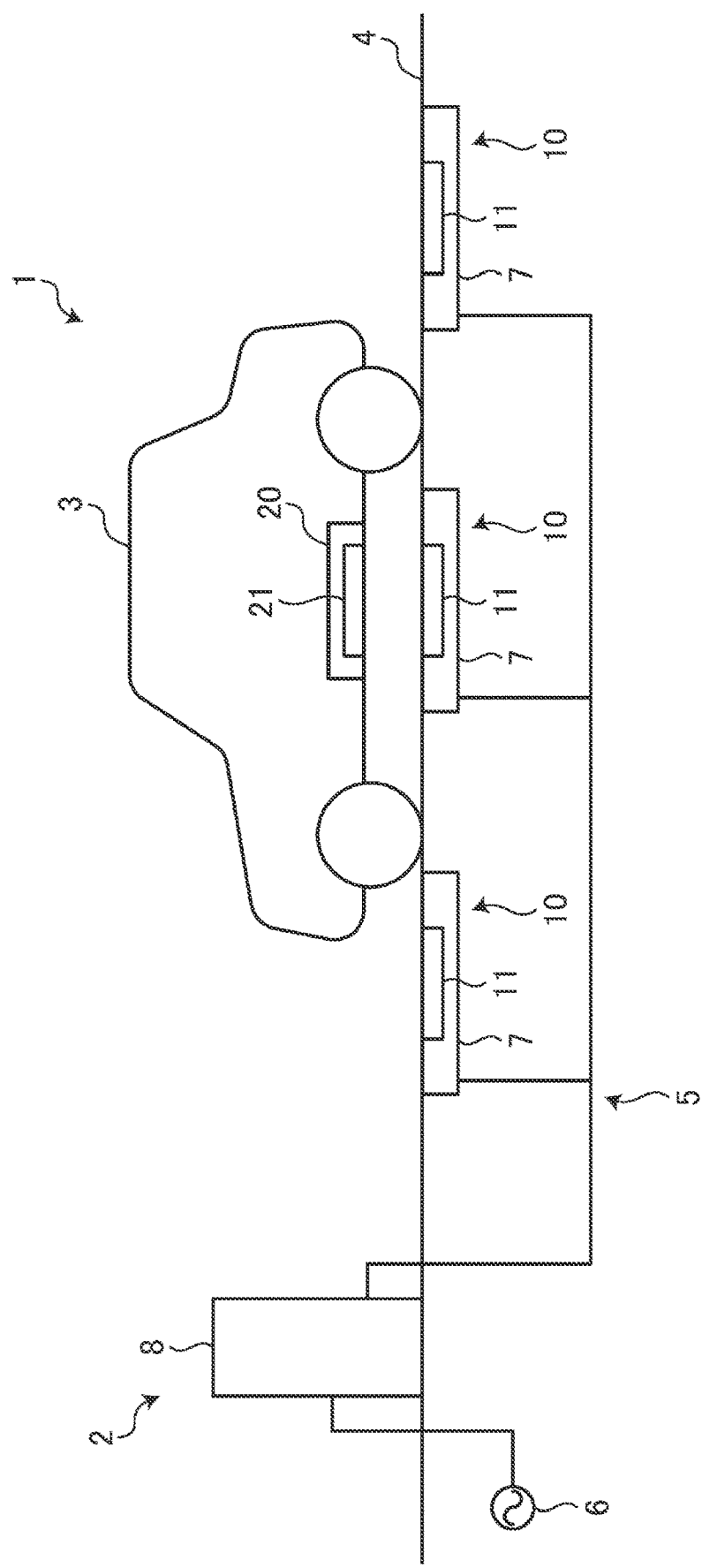
FIG. 1 is a schematic diagram showing a wireless power transmission system in an embodiment.

FIG. 1 is a schematic diagram showing a wireless power transmission system in an embodiment. The wireless power transmission system 1 includes a supply facility 2 and a vehicle 3. The supply facility 2 is equipment that supplies electric power to the running vehicle 3 in a non-contact manner. The vehicle 3 is an electrified vehicle that can be charged with electric power supplied from an external power source, such as a battery electric vehicle (BEV) or a plug-in hybrid electric vehicle (PHEV).

This wireless power transmission system 1 performs wireless power transmission from a supply facility 2 to a vehicle 3 by magnetic field resonance coupling (magnetic field resonance). The wireless power transmission system 1 transmits power from a supply facility 2 to a vehicle 3 running on a road 4 in a non-contact manner. That is, the wireless power transmission system 1 transmits power using a magnetic resonance method, and realizes power supply to the vehicle 3 while the vehicle is running using magnetic resonance coupling (magnetic field resonance). The wireless power transmission system 1 can be expressed as a dynamic wireless power transfer (D-WPT) system or a magnetic field dynamic wireless power transfer (MF-D-WPT) system.

The supply facility 2 includes a supply device 5 and an AC power source 6 that supplies power to the supply device 5. The supply device 5 transmits power supplied from the AC power source 6 to the vehicle 3 in a non-contact manner. The AC power source 6 is, for example, a commercial power source. This supply device 5 includes a power transmission device 10 having a primary coil 11.

The supply device 5 includes a segment 7 including a primary coil 11 and a management device 8 that manages the segment 7. Segment 7 is embedded within the lane of road 4. The management device 8 is installed on the side of the road 4. Segment 7 is electrically connected to management device 8. The management device 8 is electrically connected to the AC power source 6 and supplies power from the AC power source 6 to the segments 7. The segment 7 is electrically connected to the AC power source 6 via the management device 8. A plurality of segments 7 can be arranged along the lanes of the road 4. For example, as shown in FIG. 1, the supply device 5 includes three segments 7 installed in line along a lane on the road 4, and one management device 8 to which the three segments 7 are connected. The segment 7 has a function of transmitting electric power from the supply device 5 to the vehicle 3 in a contactless manner. The management device 8 has a function of controlling wireless power transmission in the segment 7.

The vehicle 3 includes a power receiving device 20 having a secondary coil 21. The power receiving device 20 is provided at the bottom of the vehicle 3. When the vehicle 3 travels on the road 4 on which the primary coil 11 is installed, the primary coil 11 on the ground side and the secondary coil 21 on the vehicle side face each other in the vertical direction. The wireless power transmission system 1 transmits power from the primary coil 11 of the power transmission device 10 to the secondary coil 21 of the power receiving device 20 in a non-contact manner while the vehicle 3 is traveling on the road 4.

In this description, traveling means a state in which the vehicle 3 is located on the road 4 for traveling. While traveling, a state in which the vehicle 3 is temporarily stopped on the road 4 is also included. For example, a state in which the vehicle 3 is stopped on the road 4 due to waiting at a traffic light or the like is also included in the traveling state. On the other hand, even if the vehicle 3 is located on the road 4, for example, if the vehicle 3 is parked or stopped, it is not included in the running state.

In addition, in this explanation, the lane in which the primary coil 11 (segment 7) is embedded is referred to as a D-WPT lane, which is a part of the road 4 where wireless power transmission by the supply device 5 is possible. This is sometimes referred to as a D-WPT charging site. In the D-WPT lane and the D-WPT charging site, a plurality of primary coils 11 (a plurality of segments 7) are installed in line in the traveling direction of the vehicle 3 over a predetermined section of the road 4.

Figure 2:
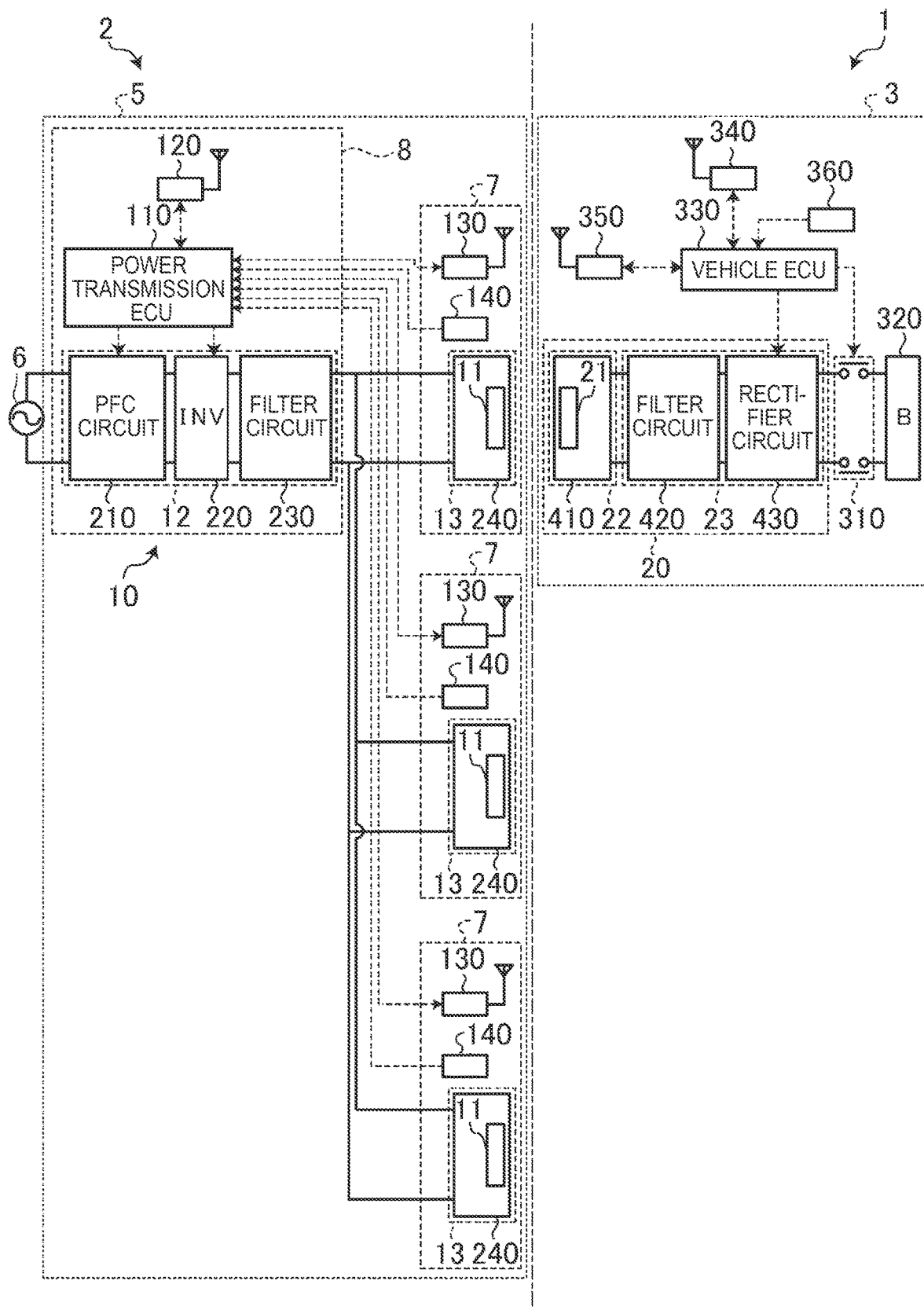
FIG. 2 is a diagram showing the overall configuration of the wireless power transmission system.

FIG. 2 is a diagram showing the overall configuration of the wireless power transmission system. In the supply facility 2, a supply device 5 and an AC power source 6 are electrically connected. In the supply device 5, the segment 7 and the management device 8 are electrically connected.

The supply device 5 includes a configuration provided in the management device 8 and a configuration provided in the segment 7. The supply device 5 includes a power transmission device 10, a power transmission electronic control unit (power transmission ECU) 110, a first communication device 120, a second communication device 130, and a foreign object detection device 140.

Power transmission device 10 includes an electric circuit connected to AC power source 6. The power transmission device 10 includes a power factor collection circuit (PFC circuit) 210, an inverter (INV) 220, a filter circuit 230, and a power transmission side resonant circuit 240.

PFC circuit 210 improves the power factor of AC power input from AC power source 6, converts the AC power into DC power, and outputs the DC power to inverter 220. This PFC circuit 210 is configured to include an AC/DC converter. PFC circuit 210 is electrically connected to AC power source 6.

Inverter 220 converts DC power input from PFC circuit 210 into AC power. Each switching element of the inverter 220 is composed of an insulated gate bipolar transistor (IGBT), a metal-oxide-semiconductor field effect transistor (MOSFET), etc., and performs a switching operation in response to a control signal from the power transmission ECU 110. For example, the driving frequency of inverter 220 is 85 kHz. Inverter 220 outputs the converted AC power to filter circuit 230.

The filter circuit 230 removes noise contained in the alternating current input from the inverter 220 and supplies the noise-free alternating current power to the power transmission side resonant circuit 240. The filter circuit 230 is an LC filter that combines a coil and a capacitor. For example, the filter circuit 230 is constituted by a T-type filter in which two coils and one capacitor are arranged in a T-shape. The PFC circuit 210, the inverter 220, and the filter circuit 230 constitute the power conversion unit 12 of the power transmission device 10.

The power transmission side resonant circuit 240 is a power transmission unit that transmits the AC power supplied from the filter circuit 230 to the power receiving device 20 in a non-contact manner. When AC power is supplied from the filter circuit 230 to the power transmission side resonant circuit 240, current flows through the primary coil 11, and a magnetic field for power transmission is generated.

The power transmission side resonant circuit 240 includes a primary coil 11 and a resonant capacitor. The primary coil 11 is a power transmission coil. This resonant capacitor is connected in series to one end of the primary coil 11, and adjusts the resonant frequency of the power transmission side resonant circuit. This resonant frequency is between 10 kHz and 100 GHz, preferably 85 kHz. For example, the power transmission device 10 is configured such that the resonance frequency of the power transmission side resonant circuit 240 and the drive frequency of the inverter 220 match. The power transmission side resonant circuit 240 constitutes the primary device 13 of the power transmission device 10.

The power transmission device 10 includes a power conversion unit 12 and a primary device 13. Power conversion unit 12 includes a PFC circuit 210, an inverter 220, and a filter circuit 230. The primary device 13 includes a power transmission side resonant circuit 240. The power transmission device 10 has a configuration in which the power conversion unit 12 is provided in the management device 8 and the primary device 13 is provided in the segment 7.

In the supply device 5, the power conversion unit 12 of the power transmission device 10, the power transmission ECU 110, and the first communication device 120 are provided in the management device 8, and the primary device 13 of the power transmission device 10, the second communication device 130, and a foreign object detection device 140 are provided in the segment 7.

Power transmission ECU 110 is an electronic control device that controls supply device 5. Power transmission ECU 110 includes a processor and memory. The processor includes a central processing unit (CPU), a digital signal processor (DSP), a field-programmable gate array (FPGA), and the like. Memory is a main storage device, and includes random access memory (RAM), read only memory (ROM), and the like. The power transmission ECU 110 loads a program stored in a storage unit into a working area of memory (main memory) and executes it, controls each component through the execution of the program to realize functions that meet a predetermined purpose. The storage unit includes a recording medium such as an erasable programmable ROM (EPROM), a hard disk drive (HDD), and a removable medium. Examples of removable media include disc recording media such as universal serial bus memory (USB memory), compact disc (CD), digital versatile disc (DVD), and Blu-ray (registered trademark) Disc (BD). The storage unit can store an operating system (OS), various programs, various tables, various databases, and the like. Signals from various sensors are input to power transmission ECU 110. A signal from foreign object detection device 140 is input to power transmission ECU 110. Power transmission ECU 110 then executes various controls based on signals input from various sensors.

For example, power transmission ECU 110 executes power control to adjust power for power transmission. In power control, power transmission ECU 110 controls power transmission device 10. Power transmission ECU 110 outputs a control signal to power conversion unit 12 in order to control the power supplied from power conversion unit 12 to primary device 13. Power transmission ECU 110 controls a switching element included in PFC circuit 210 to adjust power for transmission, and also controls a switching element included in inverter 220 to adjust power for transmission.

Furthermore, power transmission ECU 110 executes communication control to control communication with vehicle 3. In communication control, power transmission ECU 110 controls first communication device 120 and second communication device 130.

The first communication device 120 is a ground-side communication device that performs wide area wireless communication. The first communication device 120 performs wireless communication with a vehicle 3, among the vehicles 3 traveling on the road 4, that is before approaching the WPT lane. The state before approaching the WPT lane means that the vehicle 3 is in a position where it cannot perform short-range wireless communication with the supply device 5.

Wide area wireless communication is communication with a communication distance of 10 meters to 10 kilometers. Wide area wireless communication has a longer communication distance than narrow area wireless communication. As the wide area wireless communication, various types of wireless communication having a long communication distance can be used. For example, communication based on communication standards such as 4G, LTE, 5G, and WiMAX established by 3GPP (registered trademark), and IEEE is used for wide area wireless communication. In the wireless power transmission system 1, vehicle information linked to vehicle identification information (vehicle ID) is transmitted from the vehicle 3 to the supply device 5 using wide area wireless communication.

The second communication device 130 is a ground-side communication device that performs short-range wireless communication. The second communication device 130 performs wireless communication with a vehicle 3 that approaches or enters the WPT lane among the vehicles 3 traveling on the road 4. The state approaching the WPT lane means that the vehicle 3 is in a position where it can perform short-range wireless communication with the supply device 5.

Short-range wireless communication is communication with a communication distance of less than 10 meters. Short-range wireless communication is communication that has a shorter communication distance than wide-area wireless communication. As the short-range wireless communication, various short-range wireless communications with short communication distances can be used. For example, communication based on any communication standard established by IEEE, ISO, IEC, etc. is used for short-range wireless communication. As an example, Wi-Fi (registered trademark), Bluetooth (registered trademark), ZigBee (registered trademark), etc. are used for short-range wireless communication. Alternatively, radio frequency identification (RFID), dedicated short range communication (DSRC), etc. may be used as a technique for performing short range wireless communication. In the wireless power transmission system 1, vehicle identification information and the like are transmitted from the vehicle 3 to the supply device 5 using short-range wireless communication.

The foreign object detection device 140 detects metal foreign objects, living organisms, etc. present above the primary coil 11. The foreign object detection device 140 includes, for example, a sensor coil installed on the ground, an imaging device, and the like. The foreign object detection device 140 is used to perform a foreign object detection function (FOD) and a living object protection function (LOP) in the wireless power transmission system 1.

In the supply device 5, the configuration of the power transmission device 10 is divided into segments 7 and management device 8, and three segments 7 are connected to one management device 8. The power transmission device 10 is configured such that one inverter supplies power to three power transmission side resonant circuits 240. Further, in the supply device 5, signals from each segment 7 are input to the management device 8. Signals from the second communication device 130 and foreign object detection device 14 provided in the first segment are input to the power transmission ECU 110. Similarly, signals from the second communication device 130 and the foreign object detection device 14 provided in the second segment are input to the power transmission ECU 110. Signals from the second communication device 130 and foreign object detection device 14 provided in the third segment are input to the power transmission ECU 110. The power transmission ECU 110 can grasp the state of each segment 7 based on the signals input from each segment 7.

The vehicle 3 includes a power receiving device 20, a charging relay 310, a battery 320, a vehicle ECU 330, a third communication device 340, a fourth communication device 350, and a global positioning system receiver (GPS receiver) 360.

Power receiving device 20 supplies power received from power transmission device 10 to battery 320. Power receiving device 20 is electrically connected to battery 320 via charging relay 310. The power receiving device 20 includes a power receiving side resonant circuit 410, a filter circuit 420, and a rectifier circuit 430.

The power receiving side resonant circuit 410 is a power receiving unit that receives power transmitted contactlessly from the power transmission device 10. The power receiving side resonant circuit 410 is configured by a power receiving side resonant circuit including the secondary coil 21 and a resonant capacitor. The secondary coil 21 is a power receiving coil that receives power transmitted from the primary coil 11 in a non-contact manner. This resonant capacitor is connected in series to one end of the secondary coil 21 and adjusts the resonant frequency of the power receiving side resonant circuit. The resonant frequency of the power receiving side resonant circuit 410 is determined to match the resonant frequency of the power transmission side resonant circuit 240.

The resonant frequency of the power receiving side resonant circuit 410 is the same as the resonant frequency of the power transmission side resonant circuit 240. Therefore, when a magnetic field is generated by the power transmission side resonant circuit 240 while the power receiving side resonant circuit 410 faces the power transmission side resonant circuit 240, the vibration of the magnetic field is transmitted to the power receiving side resonant circuit 410. The primary coil 11 and the secondary coil 21 enter into a resonant state. When an induced current flows through the secondary coil 21 due to electromagnetic induction, an induced electromotive force is generated in the power receiving side resonant circuit 410. The power receiving side resonant circuit 410 receives the power transmitted contactlessly from the power transmission side resonant circuit 240 in this manner. The power receiving side resonant circuit 410 then supplies the power received from the power transmission side resonant circuit 240 to the filter circuit 420. The power receiving side resonant circuit 410 constitutes the secondary device 22 of the power receiving device 20.

The filter circuit 420 removes noise contained in the alternating current input from the power receiving side resonant circuit 410 and outputs the noise-removed alternating current power to the rectifier circuit 430. Filter circuit 420 is an LC filter that combines a coil and a capacitor. For example, the filter circuit 420 is constituted by a T-type filter in which two coils and one capacitor are arranged in a T-shape.

The rectifier circuit 430 converts the AC power input from the filter circuit 420 into DC power and outputs the DC power to the battery 320. The rectifier circuit 430 is configured by, for example, a full-bridge circuit in which four diodes are connected as rectifiers in a full-bridge manner. A switching element is connected in parallel to each diode of the rectifier circuit 430. Each switching element of the rectifier circuit 430 is constituted by an IGBT, and performs a switching operation in response to a control signal from the vehicle ECU 330. Rectifier circuit 430 supplies the converted DC power to battery 320. The filter circuit 420 and the rectifier circuit 430 constitute the power conversion unit 23 of the power receiving device 20.

The power receiving device 20 includes a secondary device 22 and a power conversion unit 23. Secondary device 22 includes a power receiving side resonant circuit 410. Power conversion unit 23 includes a filter circuit 420 and a rectifier circuit 430.

Charging relay 310 is provided between rectifier circuit 430 and battery 320. The opening/closing state of charging relay 310 is controlled by vehicle ECU 330. When the power transmission device 10 charges the battery 320, the charging relay 310 is controlled to be in the closed state. When charging relay 310 is in the closed state, rectifier circuit 430 and battery 320 are electrically connected. When charging relay 310 is in the open state, current cannot flow between rectifier circuit 430 and battery 320. For example, when charging relay 310 is in an open state, vehicle 3 does not request power supply.

The battery 320 is a rechargeable DC power source, and is configured with, for example, a lithium ion battery, a nickel metal hydride battery, or the like. The battery 320 stores power supplied from the power transmission device 10 to the power receiving device 20. Further, the battery 320 can supply power to the driving motor of the vehicle 3. The battery 320 is electrically connected to the driving motor via a power control unit (PCU). The PCU is a power conversion device that converts DC power from the battery 320 into AC power and supplies the AC power to the driving motor. Each switching element of the PCU is composed of an IGBT, and performs a switching operation in response to control signals from the vehicle ECU 330 and the like.

Vehicle ECU 330 is an electronic control device that controls vehicle 3. Vehicle ECU 330 has the same hardware configuration as power transmission ECU 110. Signals from various sensors mounted on the vehicle 3 are input to the vehicle ECU 330. Furthermore, the positioning signal received by the GPS receiver 360 is input to the vehicle ECU 330. Vehicle ECU 330 can acquire current position information of vehicle 3 from GPS receiver 360. Vehicle ECU 330 then executes various controls based on signals input from various sensors.

For example, the vehicle ECU 330 executes contactless charging control in which power is transmitted from the primary coil 11 to the secondary coil 21 in a contactless manner and the power received by the secondary coil 21 is stored in the battery 320. In non-contact charging control, vehicle ECU 330 controls rectifier circuit 430, charging relay 310, third communication device 340, and fourth communication device 350. The non-contact charging control includes power control that controls charging power and communication control that controls communication with the supply device 5. In power control, vehicle ECU 330 controls switching elements included in rectifier circuit 430 to adjust the power (charging power) supplied from power receiving device 20 to battery 320. In communication control, vehicle ECU 330 controls third communication device 340 and fourth communication device 350.

The third communication device 340 is a vehicle-side communication device that performs wide area wireless communication. The third communication device 340 performs wireless communication with the first communication device 120 of the supply device 5 before the vehicle 3 traveling on the road 4 approaches the WPT lane. Wide area wireless communication is two-way wireless communication. Communication between the first communication device 120 and the third communication device 340 is performed by high-speed wireless communication.

The fourth communication device 350 is a vehicle-side communication device that performs short-range wireless communication. The fourth communication device 350 performs wireless communication with the second communication device 130 of the supply device 5 when the vehicle 3 approaches or enters the WPT lane. Short-range wireless communication is unidirectional wireless signaling. Unidirectional wireless signaling is point to point signaling (P2PS). P2PS is used to notify vehicle identification information from the vehicle 3 to the supply device 5 in each activity of pairing, alignment check, magnetic coupling check, end of power transfer, and end of power transfer. P2PS can also be used as a lateral alignment check. The lateral direction refers to the width direction of the lane and the width direction of the vehicle 3.

GPS receiver 360 detects the current position of vehicle 3 based on positioning information obtained from a plurality of positioning satellites. Current position information of vehicle 3 detected by GPS receiver 360 is transmitted to vehicle ECU 330.

Note that in the supply device 5, the filter circuit 230 may be included in the management device 8 instead of the segment 7. That is, the filter circuit 230 may be installed on the side of the road 4. In this case, the power conversion unit 12 includes a PFC circuit 210, an inverter 220, and a filter circuit 230, and the primary device 13 includes a power transmission side resonant circuit 240.

Further, the filter circuit 230 may be provided for each primary coil 11 individually, or may be provided for a plurality of primary coils 11 all at once.

Further, the filter circuit 230 is not limited to a T-type filter, but may be a bandpass filter in which a coil and a capacitor are connected in series, for example. This also applies to the filter circuit 420 of the vehicle 3.

Further, in the power transmission device 10, when the inverter 220 is connected to the plurality of primary coils 11, each primary device 13 may be provided with a changeover switch for switching the primary coil 11 to be energized. This changeover switch may be provided in the management device 8 beside the road 4, or may be provided near the primary coil 11.

Further, the power transmission side resonant circuit 240 is not limited to a configuration in which the primary coil 11 and the resonant capacitor are connected in series. The primary coil 11 and the resonant capacitor may be connected in parallel, or may be a combination of parallel and series connections. In short, the power transmission side resonant circuit 240 may be configured such that the resonance frequency of the power transmission side resonant circuit 240 matches the drive frequency of the inverter 220, and the connection relationship of its components is not particularly limited. This also applies to the power receiving side resonant circuit 410 of the vehicle 3.

Further, the driving frequency of the inverter 220 is not limited to 85 kHz, but may be a frequency around 85 kHz. In short, the driving frequency of inverter 220 may be in a predetermined frequency band including 85 kHz.

Further, the power transmission device 10 may have a configuration in which a plurality of inverters 220 are connected to the output side power line (DC power line) of the PFC circuit 210.

Further, the foreign object detection device 140 may be provided not only on the ground side but also on the vehicle 3 side. For example, when the foreign object detection device on the vehicle 3 side detects a foreign object or a living body present above the primary coil 11, the power supply request can be stopped until the vehicle 3 passes the primary coil 11.

In addition, in the wireless power transmission system 1, the information transmitted from the vehicle 3 to the supply device 5 using short-range wireless communication includes, in addition to vehicle identification information, a power supply request, a power supply request value, etc. The power supply request is information indicating that power transmission from the primary coil 11 is requested. The power supply request value is a request value for the amount of power transmitted from the supply device 5 to the vehicle 3. Vehicle ECU 330 can calculate the required power supply value based on the SOC of battery 320.

Furthermore, the wireless power transmission system 1 is not limited to the method of feeding power from the ground to the vehicle 3, but can also realize a method of feeding power from the vehicle 3 to the ground. In this case, the rectifier circuit 430 can be replaced with an inverter to realize rectification during power supply and power reception.

Figure 3:
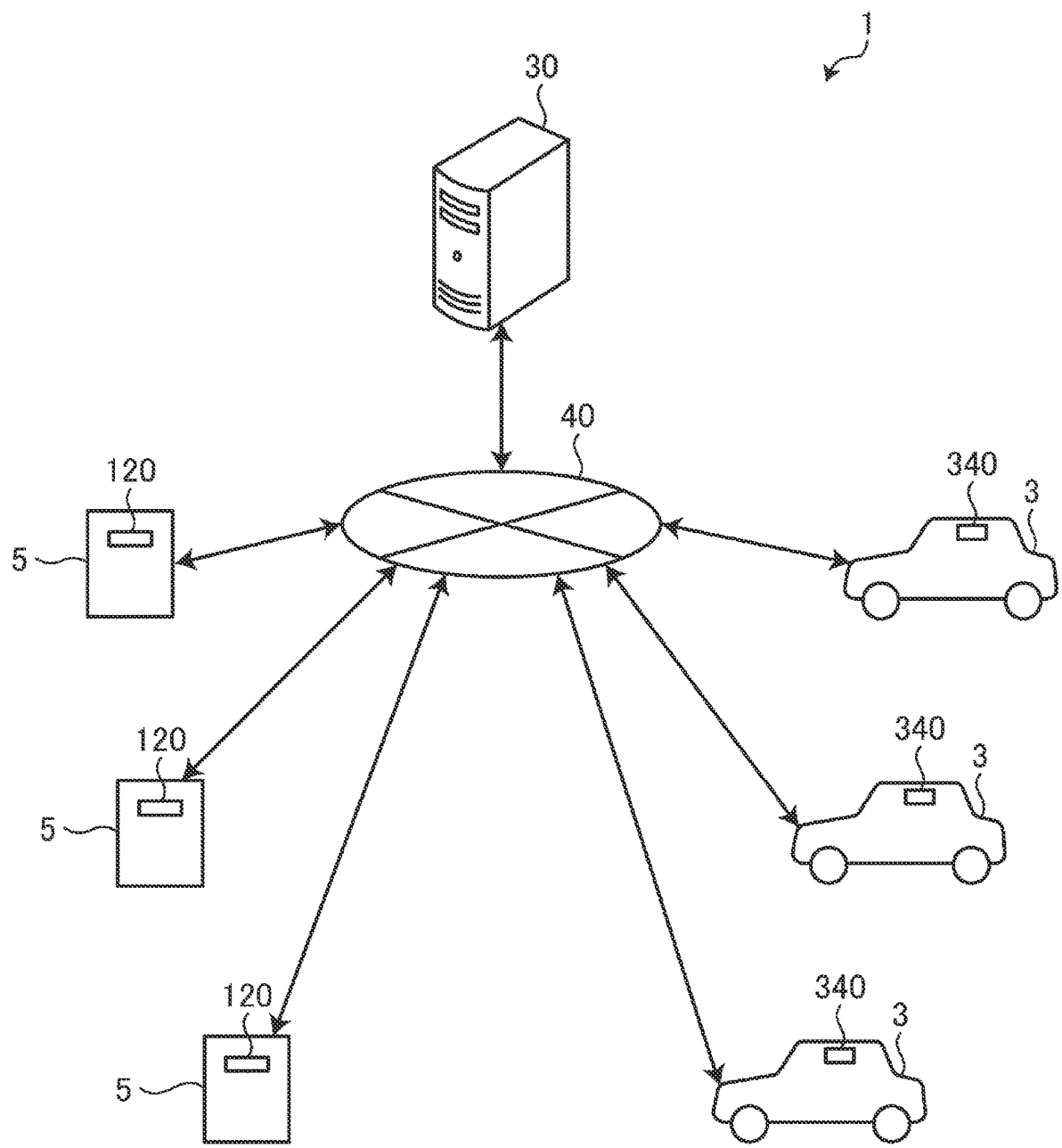
FIG. 3 is a schematic diagram for explaining wide area wireless communication in a wireless power transmission system.

FIG. 3 is a schematic diagram for explaining wide area wireless communication in a wireless power transmission system.

In the wireless power transmission system 1, the vehicle 3 can communicate with the server 30, and the supply device 5 can communicate with the server 30. The server 30 is connected to a network 40 and can communicate with multiple vehicles 3 and multiple supply devices 5 via the network 40. The network 40 includes a wide area network (WAN), which is a public communication network such as the Internet, a telephone communication network of a mobile phone, and the like.

The vehicle 3 connects to the network 40 by wide area wireless communication using the third communication device 340. Vehicle 3 transmits information to server 30 and receives information from server 30.

The supply device 5 connects to the network 40 by wide area wireless communication using the first communication device 120. The supply device 5 transmits information to the server 30 and receives information from the server 30.

Figure 4:
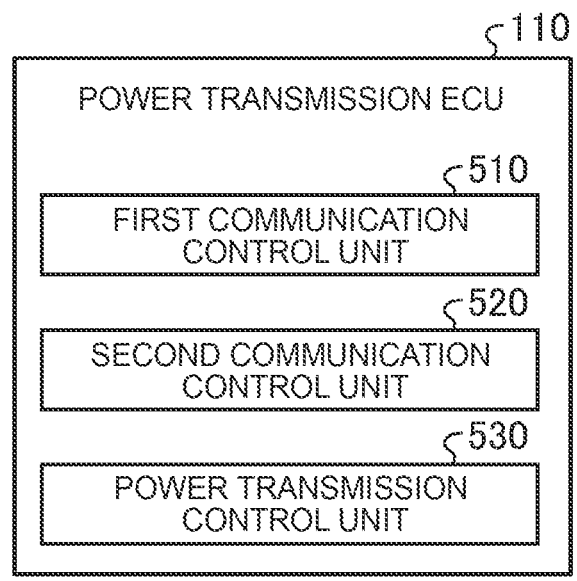
FIG. 4 is a block diagram for explaining the functional configuration of the power transmission ECU.

FIG. 4 is a block diagram showing the functional configuration of the power transmission ECU. Power transmission ECU 110 includes a first communication control unit 510, a second communication control unit 520, and a power transmission control unit 530.

The first communication control unit 510 executes first communication control to control the first communication device 120. The first communication control is to control wide area wireless communication on the side of the supply device 5, and controls communication of the supply device 5 using the first communication device 120. That is, the first communication control controls communication of the management device 8 of the supply device 5. The first communication control controls communication between the supply device 5 and the network 40 and also controls communication between the supply device 5 and the server 30 via the network 40. The first communication control unit 510 is a supply equipment communication controller (SECC).

The second communication control unit 520 executes second communication control to control the second communication device 130. The second communication control controls short-range wireless communication on the side of the supply device 5, and controls communication of the supply device 5 using the second communication device 130. That is, the second communication control controls communication of the segment 7 of the supply device 5. The second communication control controls communication between the supply device 5 and the vehicle 3 as communication not via the network 40. The second communication control unit 520 is a primary device communication controller (PDCC).

The power transmission control unit 530 executes power transmission control to control the power transmission device 10. Power transmission control is to control power for power transmission, and controls the power conversion unit 12 of the power transmission device 10. Power transmission control unit 530 executes power control to control PFC circuit 210 and inverter 220.

Figure 5:
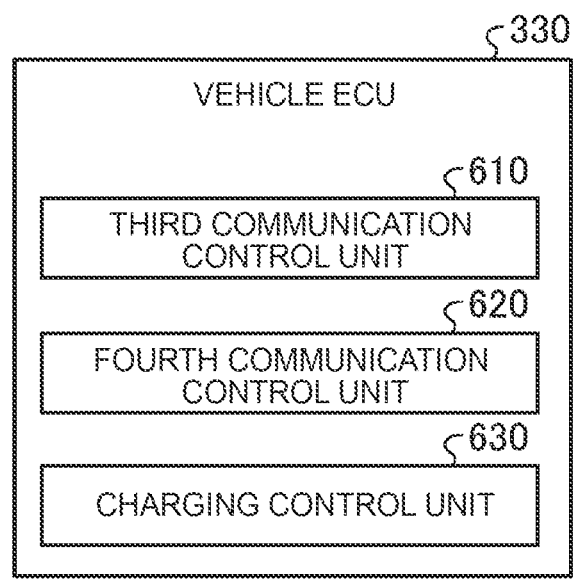
FIG. 5 is a block diagram for explaining the functional configuration of the vehicle ECU.

FIG. 5 is a block diagram showing the functional configuration of the vehicle ECU. Vehicle ECU 330 includes a third communication control unit 610, a fourth communication control unit 620, and a charging control unit 630.

The third communication control unit 610 executes third communication control to control the third communication device 340. The third communication control controls wide area wireless communication on the vehicle 3 side, and controls communication of the vehicle 3 using the third communication device 340. The third communication control controls communication between the vehicle 3 and the network 40 and also controls the communication between the vehicle 3 and the server 30 via the network 40. The third communication control unit 610 is an EV communication controller (EVCC).

The fourth communication control unit 620 executes fourth communication control to control the fourth communication device 350. The fourth communication control controls short-range wireless communication on the vehicle 3 side, and controls communication of the vehicle 3 using the fourth communication device 350. The fourth communication control controls communication between the vehicle 3 and the supply device 5 as communication not via the network 40. The fourth communication control unit 620 is a secondary device communication controller (SDCC).

Charging control unit 630 executes charging control to control power receiving device 20 and charging relay 310. The charging control includes power control that controls the received power in the secondary device 22 and relay control that controls the connection state between the secondary device 22 and the battery 320. Charging control unit 630 executes power control to control rectifier circuit 430. Charging control unit 630 executes relay control to switch the open/closed state of charging relay 310.

In the wireless power transmission system 1 configured in this way, wireless power transmission from the supply device 5 to the vehicle 3 is performed in a state where wireless communication is established between the vehicle 3 and the supply device 5. In a state in which the vehicle 3 and the supply device 5 are paired by wireless communication, power is transmitted from the ground-side primary coil 11 to the vehicle-side secondary coil 21 in a non-contact manner. Then, in the vehicle 3, charging control is performed to supply the electric power received by the secondary coil 21 to the battery 320.

Next, the power transfer process (D-WPT process) will be explained with reference to FIG. 6. The power transfer process is structured as a chain of multiple activities and is a process derived from states and corresponding transitions.

Figure 6:
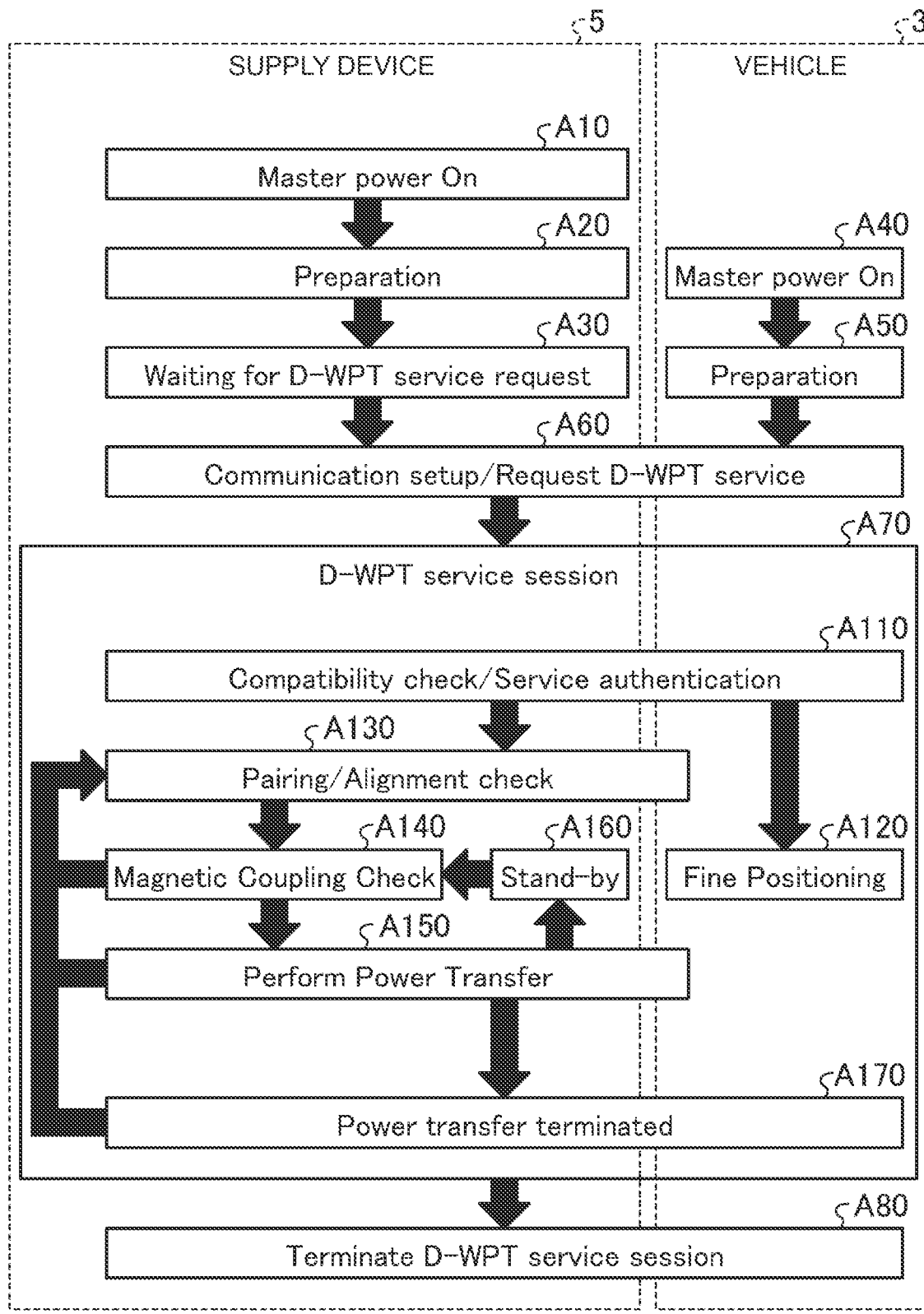
FIG. 6 is a diagram for explaining the power transfer process.

FIG. 6 is a diagram for explaining the power transfer process. In FIG. 6, basic activities are shown to explain the power transfer process. The thick arrows shown in FIG. 6 represent transition lines. The state of the wireless power transmission system 1 in the power transfer process is represented by activities that constitute the power transfer process.

The activities that make up the power transfer process are the power transfer service session (D-WPT service session A70), which is the activity at the stage of power transmission, the activity at the stage before power transmission, and the activity at the stage after power transmission. Further, the activity can be explained by dividing the main body of the operation depending on the presence or absence of communication between the supply device 5 and the vehicle 3. The activities can be divided into one that represents the state of only the supply device 5 side without communication, one that represents the state of only the vehicle 3 side without communication, and one that represents the state of both the supply device 5 and vehicle 3 that have communication.

As shown in FIG. 6, the activities include master power on state (Master power On) A10, Preparation A20, waiting for a request from vehicle 3 (Waiting for D-WPT service request) A30, master power on state (Master power On) A40, Preparation A50, Communication setup and Request D-WPT service A60, D-WPT service session A70, and Terminate D-WPT service session A80.

Preparation A20 is the preparation state of the supply device 5. In Preparation A20, the supply device 5 performs circuit activation and safety confirmation without communication with the vehicle 3. The supply device 5 transitions to the state of Preparation A20 when the state is the Master power On A10. If the supply device 5 activates the circuit and confirms safety in Preparation A20, the state changes to Waiting for D-WPT service request A30 from the vehicle 3. On the other hand, if there is a problem with the supply device 5, the supply device 5 notifies the vehicle 3 of information indicating that the wireless power transmission system 1 cannot be used (notification of unavailability) through wide area wireless communication. The first communication device 120 transmits a notice of unavailability to the vehicle 3.

Preparation A50 is the preparation state of the vehicle 3. In Preparation A50, the vehicle 3 activates the circuit and performs a safety check without communicating with the supply device 5. When the state is the Master power On A40, the vehicle 3 transitions to the state of Preparation A50. If the vehicle 3 activates the circuit and confirms safety in Preparation A50, the state changes to communication setup and Request D-WPT service A60. On the other hand, if there is a problem with the vehicle 3, the vehicle 3 will not start wide area wireless communication and will not perform the subsequent sequences in the D-WPT process.

The communication setup and Request D-WPT service A60 is initiated by the vehicle ECU 330. In communication setup and Request D-WPT service A60, vehicle ECU 330 starts wide area wireless communication. First, when the vehicle 3 transitions from Preparation A50 to communication setup and Request D-WPT service A60, the third communication device 340 transmits a D-WPT service request signal. The third communication device 340 performs wireless communication with the first communication device 120 corresponding to the D-WPT lane into which the vehicle 3 is scheduled to enter or has entered. The first communication device 120 to be communicated with is selected based on the relative positional relationship between the current position of the vehicle 3 and the position of the D-WPT lane. On the supply device 5 side, in the state of Waiting for D-WPT service request A30 from the vehicle 3, when the first communication device 120 receives a D-WPT service request signal, the state changes to communication setting and Request D-WPT service A60. Various types of information between wide area wireless communication and P2PS communication are linked using vehicle identification information. The processing sequence of this communication setting and Request D-WPT service A60 is shown in FIG. 7.

Figure 7:
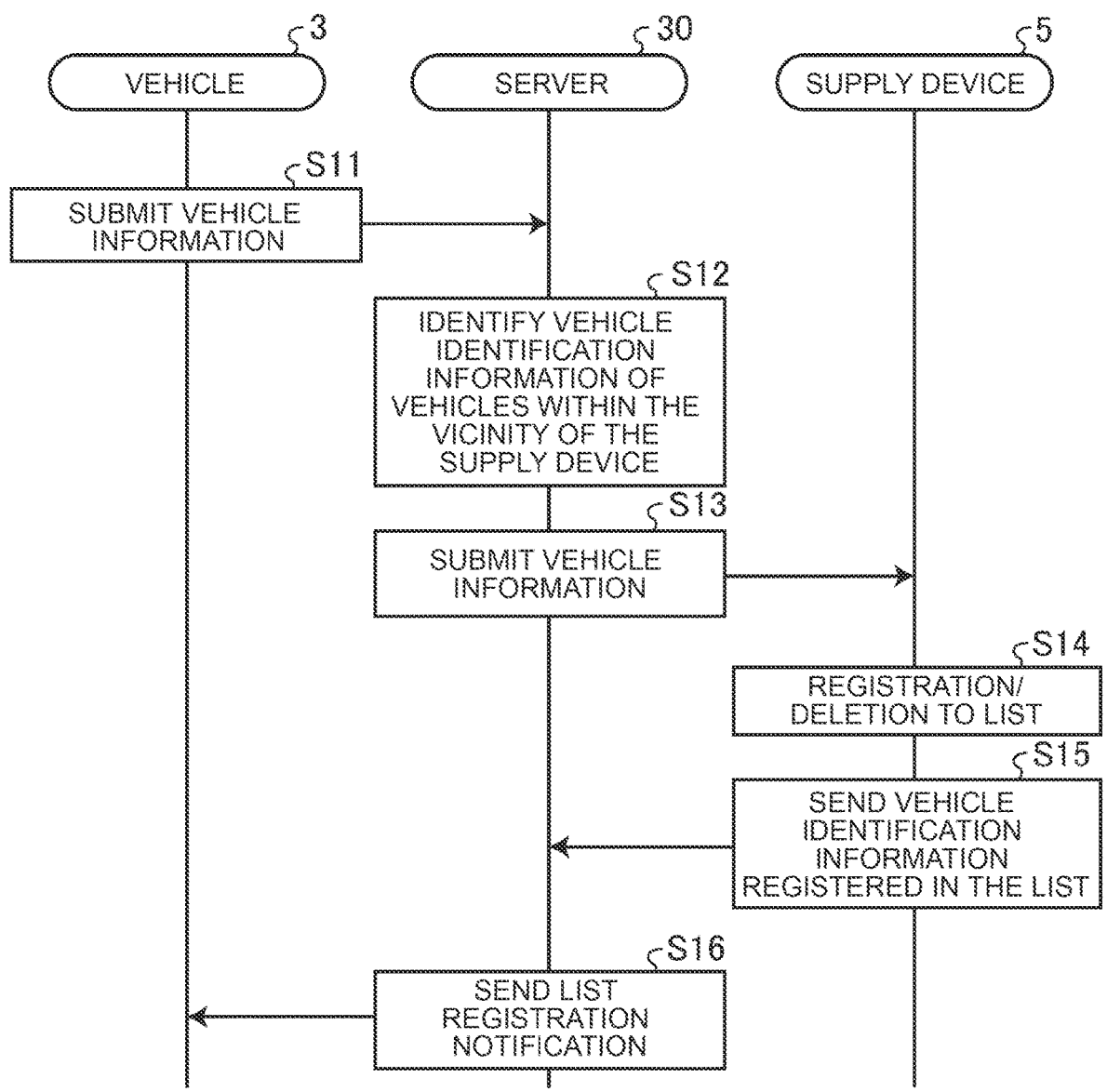
FIG. 7 is a sequence diagram showing a case where communication using wide area wireless communication is carried out between a vehicle and a supply device.

FIG. 7 is a sequence diagram showing a case where communication using wide area wireless communication is carried out between the vehicle and the supply device. The vehicle 3 transmits vehicle information to the server 30 (S11). In S11, the third communication device 340 of the vehicle 3 transmits vehicle information to the server 30. The vehicle information includes vehicle identification information, various parameters of the power receiving device 20, current position information of the vehicle 3, and requested power. Vehicle ECU 330 calculates the required power based on the SOC (State of Charge) of battery 320. In S11, the vehicle ECU 330 causes the third communication device 340 to transmit vehicle information at predetermined time intervals. The predetermined time is set according to the distance from the current position of the vehicle 3 to the starting point of the WPT lane. The shorter the distance from the vehicle 3 to the starting point of the WPT lane, the shorter the predetermined time interval.

When the server 30 receives the vehicle information from the vehicle 3, it specifies the vehicle identification information of the vehicle 3 located in the vicinity of the supply device 5 based on the current position information of the vehicle 3 included in the vehicle information (S12). In S12, the server 30 identifies the vehicle 3 located within a predetermined vicinity area from the supply device 5 based on the current position information of the vehicle 3 and the position information of the supply device 5. The nearby area is set, for example, to an area within 500 meters.

After identifying the vehicle identification information of the vehicle 3, the server 30 transmits the vehicle information to the supply device 5 (S13). In S13, the transmitting device of the server 30 transmits vehicle information to the supply device 5.

When the supply device 5 receives the vehicle information from the server 30, it registers and deletes the vehicle identification information from the identification information list (S14). In S14, the power transmission ECU 110 registers and deletes vehicle identification information from the identification information list so that the vehicle identification information linked to the vehicle information is registered in the identification information list without excess or deficiency.

After registering and deleting the vehicle identification information from the identification information list, the supply device 5 transmits the vehicle identification information registered in the identification information list to the server 30 (S15). In S15, the first communication device 120 of the supply device 5 transmits vehicle identification information to the server 30.

Then, upon receiving the vehicle identification information from the supply device 5, the server 30 transmits a list registration notification to the vehicle 3 corresponding to the vehicle identification information registered in the identification information list (S16). In S16, the communication device of the server 30 transmits a list registration notification to the vehicle 3. The list registration notification is a notification indicating that the vehicle identification information is registered in the identification information list, and includes identification information of the supply device 5 and position information of the supply device 5.

In this way, when the vehicle 3 starts wide area wireless communication and both the supply device 5 and the vehicle 3 reach the state of communication setup and Request D-WPT service A60, it means that the communication setup by wide area wireless communication has been successful. With the success of this communication setup, the state transitions to D-WPT service session A70.

Return to FIG. 6. In the D-WPT service session A70, in a state where a communication connection is established between the supply device 5 and the vehicle 3, power is transmitted from the power transmission side resonant circuit 240 of the supply device 5 to the power receiving side resonant circuit 410 of the vehicle 3 in a non-contact manner. The D-WPT service session A70 starts with successful communication setup and ends with the end of communication. When communication ends in the state of D-WPT service session A70, the state changes to Terminate D-WPT service session A80.

At Terminate D-WPT service session A80, the vehicle 3 ends wide area wireless communication with the supply device 5. The vehicle 3 and the supply device 5 can receive a trigger for the termination of the D-WPT service session A70. Then, the vehicle ECU 330 prevents the secondary device 22 and the vehicle 3 from starting D-WPT until the third communication device 340 receives the next notification (D-WPT service request signal).

Here, detailed activities of the D-WPT service session A70 will be explained.

D-WPT service session A70 includes compatibility check and service authentication A110, fine positioning A120, and pairing and alignment check A130, Magnetic Coupling Check A140, Perform Power Transfer A150, Stand-by A160, and the power transfer terminated A170.

The compatibility check and service authentication A110 will be explained. After successful communication setup, vehicle ECU 330 and power transmission ECU 110 confirm that primary device 13 and secondary device 22 are compatible. The compatibility check is performed on the supply device 5 side based on information associated with vehicle identification information acquired through communication. Check items include the minimum ground clearance of the secondary device 22, the shape type of the secondary device 22, the circuit topology of the secondary device 22, the self-resonant frequency of the secondary device 22, the number of secondary coils 21, etc.

In the compatibility check and service authentication A110, the vehicle 3 first transmits compatibility information of the power receiving device 20 from the third communication device 340 to the supply device 5. The first communication device 120 of the supply device 5 receives the compatibility information of the power receiving device 20 from the vehicle 3. Then, the first communication device 120 of the supply device 5 transmits the compatibility information of the power transmission device 10 to the vehicle 3. The third communication device 340 of the vehicle 3 receives the compatibility information of the power transmission device 10 from the supply device 5.

The elements of the compatibility information that the vehicle 3 sends to the supply device 5 include vehicle identification information, WPT Power Classes, Air Gap Class, WPT Operating Frequencies, and WPT frequency adjustment, WPT Type, WPT Circuit Topology, Fine Positioning Method, Pairing Method, Alignment Method, presence/absence of power adjustment function information etc. are included.

Elements of the compatibility information that the supply device 5 sends to the vehicle 3 include supply device identification information, WPT power class, gap class, WPT drive frequency, WPT frequency adjustment, WPT type, WPT circuit topology, detailed alignment method, Includes information such as pairing method, alignment method, and presence/absence of power adjustment function.

Each element name will be explained in detail. In addition, each element of the compatibility information transmitted from the vehicle 3 to the supply device 5 will be explained, and among the compatibility information transmitted from the supply device 5 to the vehicle 3, the compatibility information transmitted from the vehicle 3 to the supply device 5 Descriptions that overlap with the above will be omitted.

The gap class is information indicating a gap class from which the secondary device 22 can receive power. The WPT power class is information indicating a power class in which the secondary device 22 can receive power. The WPT drive frequency is information indicating the frequency of received power that the secondary device 22 receives. WPT frequency adjustment is information indicating whether or not the drive frequency can be adjusted. The WPT type is information indicating the shape type of the secondary device 22 and indicates the coil shape of the secondary coil 21. Examples of the WTP type include a circular shape and a solenoid shape. The WPT circuit topology is information indicating the connection structure between the secondary coil 21 and the resonant capacitor. WTP circuit topologies include series and parallel. The detailed positioning method is information indicating how to perform positioning. The pairing method is a method in which the vehicle 3 performs pairing to identify the supply device 5. The positioning method indicates a method of checking the relative positions of the secondary device 22 and the primary device 13 before starting power transmission.

The fine positioning A120 will be explained. The vehicle 3 performs the fine positioning A120 in the vehicle lateral direction prior to or in parallel with the pairing and alignment check A130. When the vehicle ECU 330 determines that the vehicle 3 approaches or enters the area where the supply device 5 is installed (WPT lane), it starts the fine positioning A120 in the vehicle lateral direction.

Vehicle ECU 330 guides vehicle 3 to align primary device 13 and secondary device 22 within a range that establishes sufficient magnetic coupling for wireless power transfer.

The fine positioning A120 is basically performed manually or automatically on the vehicle 3 side. The fine positioning A120 can be coordinated with ADAS (Automatic Driving Assistance System).

The activity of the fine positioning A120 then continues until the vehicle 3 leaves the D-WPT charging site or the state changes to End of communication, and can executed based on the position transmitted from the supply device 5 to the vehicle 3 by wide area wireless communication. This end of communication refers to Terminate D-WPT service session A80.

Pairing and alignment check A130 will be explained. Here, pairing and alignment check will be explained separately.

Explain pairing. The P2PS interface for short range wireless communication ensures that the primary device 13 and the secondary device 22 are uniquely paired. The process of pairing status is as follows.

First, vehicle ECU 330 recognizes that vehicle 3 has approached or entered the D-WPT lane. For example, the vehicle ECU 330 has map information including the D-WPT lane, and compares it with the position information of the own vehicle obtained by the GPS receiver 360 to recognize the approach or entry based on the straight line distance etc. The vehicle 3 transmits to the server 30 which D-WPT lane it has approached via wide area wireless communication. In short, the third communication device 340 notifies the cloud of a signal indicating that the vehicle 3 has approached any D-WPT lane. Further, when the vehicle ECU 330 recognizes that the vehicle 3 approaches or enters the D-WPT lane, the fourth communication device 350 starts transmitting the modulated signal at regular intervals for pairing the primary device 13 and the secondary device 22.

Furthermore, the supply device 5 may recognize that the vehicle 3 has approached or entered the D-WPT lane using information acquired from the server 30 through wide area wireless communication. The server 30 allocates the vehicle identification information of the vehicle 3 approaching on each D-WPT lane to the supply device 5 corresponding to that lane. Since the supply device 5 only needs to refer to the vehicle identification information whose number has been narrowed down by the server 30, the authentication process can be performed in a short time. When the supply device 5 recognizes that the vehicle 3 is approaching the D-WPT lane, the second communication device 130 goes into standby mode. In standby mode, it waits to receive a modulated signal from the fourth communication device 350 of the vehicle 3. This modulated signal includes vehicle identification information.

When the second communication device 130 receives the modulated signal from the vehicle 3, the supply device 5 compares the vehicle identification information received through short-range wireless communication and the vehicle identification information in the identification information list obtained as a result of wide-area wireless communication with the plurality of vehicles 3 approaching the D-WPT lane. By this comparison, the supply device 5 identifies the vehicle 3.

When vehicle ECU 330 recognizes that vehicle 3 is outside the D-WPT lane, it stops transmitting the modulated signal from fourth communication device 350. The vehicle ECU 330 can determine whether the vehicle has passed through the D-WPT lane based on the map information and the position information of the vehicle.

The supply device 5 stops waiting for the modulated signal from the fourth communication device 350 when it is determined that the vehicle 3 is not traveling on the D-WPT lane or when it is determined that the vehicle 3 is not approaching the D-WPT lane.

Pairing is performed for the primary device 13 until the vehicle 3 leaves the D-WPT charging site or the state changes to communication terminated. When pairing is completed, the state transitions to alignment check.

The alignment check will be explained. The purpose of the alignment check is to ensure that the lateral distance between the primary device 13 and the secondary device 22 is within an acceptable range. The alignment check is performed using short range wireless communication (P2PS).

Alignment checks continue to be performed based on P2PS until the vehicle 3 leaves the D-WPT charging site or the state changes to End of Communication. The results of the alignment check can be transmitted from the first communication device 120 to the third communication device 340 via wide area wireless communication.

The magnetic coupling check A140 will be explained. In magnetic coupling check A140, the supply device 5 checks the magnetic coupling state and confirms that the secondary device 22 is within an acceptable range. When the magnetic coupling check A140 is completed, the state transitions to Perform Power Transfer A150.

Execution A150 of power transmission will be explained. In this state, the supply device 5 transmits power to the power receiving device 20. The power transmission device 10 and the power receiving device 20 need to have the ability to control transmitted power (transmitted power and received power) for the usefulness of MF-D-WPT and the protection of the power receiving device 20 and battery 320. The greater power transfer helps the receiving device 20 travel longer distance without static wireless charging and conductive charging. However, the capacity of the battery 320 varies depending on the model of the vehicle 3, and the demand for driving power may fluctuate rapidly. An example of this sudden change is sudden regenerative braking. When regenerative braking is performed while driving on the D-WPT lane, priority is given to regenerative braking, so that in addition to regenerative power, received power from power receiving device 20 is supplied to battery 320.

In this case, in order to protect the battery 320 from overcharging, the power receiving device 20 needs to adjust the transmitted power.

Despite the necessity of power control, communication is not newly started between the supply device 5 and the power receiving device 20 in this state. This is because communication can impair response and accuracy in power control due to its instability and latency. Therefore, the supply device 5 and the power receiving device 20 perform power transmission and control thereof based on known information up to this state.

The supply device 5 uses wide area wireless communication in advance to increase the transmission power for the magnetic coupling check in response to the power request transmitted from the third communication device 340. The supply device 5 attempts to keep the current and voltage fluctuations within its limits and to maximize the power transferred during the transition.

The power receiving device 20 basically receives the transmitted power from the power transmission device 10 without any control. However, the power receiving device 20 starts control when the transmitted power exceeds or is about to exceed the limit, such as the rated power of the battery 320, which varies depending on the state of charge and the power demand for driving the vehicle 3. Furthermore, the power control in the vehicle ECU 330 is also required to deal with malfunctions in wide area wireless communication. This malfunction leads to a contradiction between the power control target in the primary device 13 and a request from the third communication device 340, and a sudden failure of the power receiving device 20 and battery 320 during power transmission. The power receiving device 20 controls the transmitted power based on the power request rate notified by the first communication device 120.

The power requirements are determined based on compatibility check information such as WPT circuit topology, geometry, ground clearance, EMC (electromagnetic compatibility), etc. of the vehicle 3 and primary device 13. The magnetic field varies depending on these specifications, and it is necessary to transmit power within a range that satisfies EMC.

Power control in power transmission ECU 110 and power receiving device 20 may interfere with each other. In particular, there is a possibility of interference when the supply device 5 attempts to realize a power request larger than the latest power limit in the power receiving device 20 through wide area wireless communication. An example of this is rapid regeneration control using a relatively small battery 320 in the vehicle 3. If possible, it is desirable that the supply device 5 be able to detect mismatches between power control goals and limits and adjust the power transfer to resolve the mismatches.

When power transfer is interrupted for a short period of time while the secondary device 22 is still on top of the primary device 13, such as a case in which a foreign object is detected on the primary device 13 by the foreign object detection device 140, or in which the magnetic coupling is low due to misalignment of the secondary device 22, the state transitions to Stand-by A160. Note that if the vehicle 3 is provided with a foreign object detection device, the foreign object may be detected on the vehicle 3 side.

When the secondary device 22 passes over the primary device 13, the state transitions to the power transfer terminated A170. In this case, less power is transferred because the magnetic coupling between the two devices is weaker. The supply device 5 can detect that the magnetic coupling has weakened by monitoring the transmitted power, so the supply device 5 basically determines the state transition to the power transfer terminated A170, and then the power Start reducing voltage to stop transmission.

Stand-by A160 will be explained. In this state, the power transfer is briefly interrupted for some reason, and once the D-WPT is ready in both the vehicle 3 and the supply device 5, the state returns to Perform Power Transfer A150. If there is a possibility of interrupting power transfer, the state becomes Perform Power Transfer A150.

Figure 8:
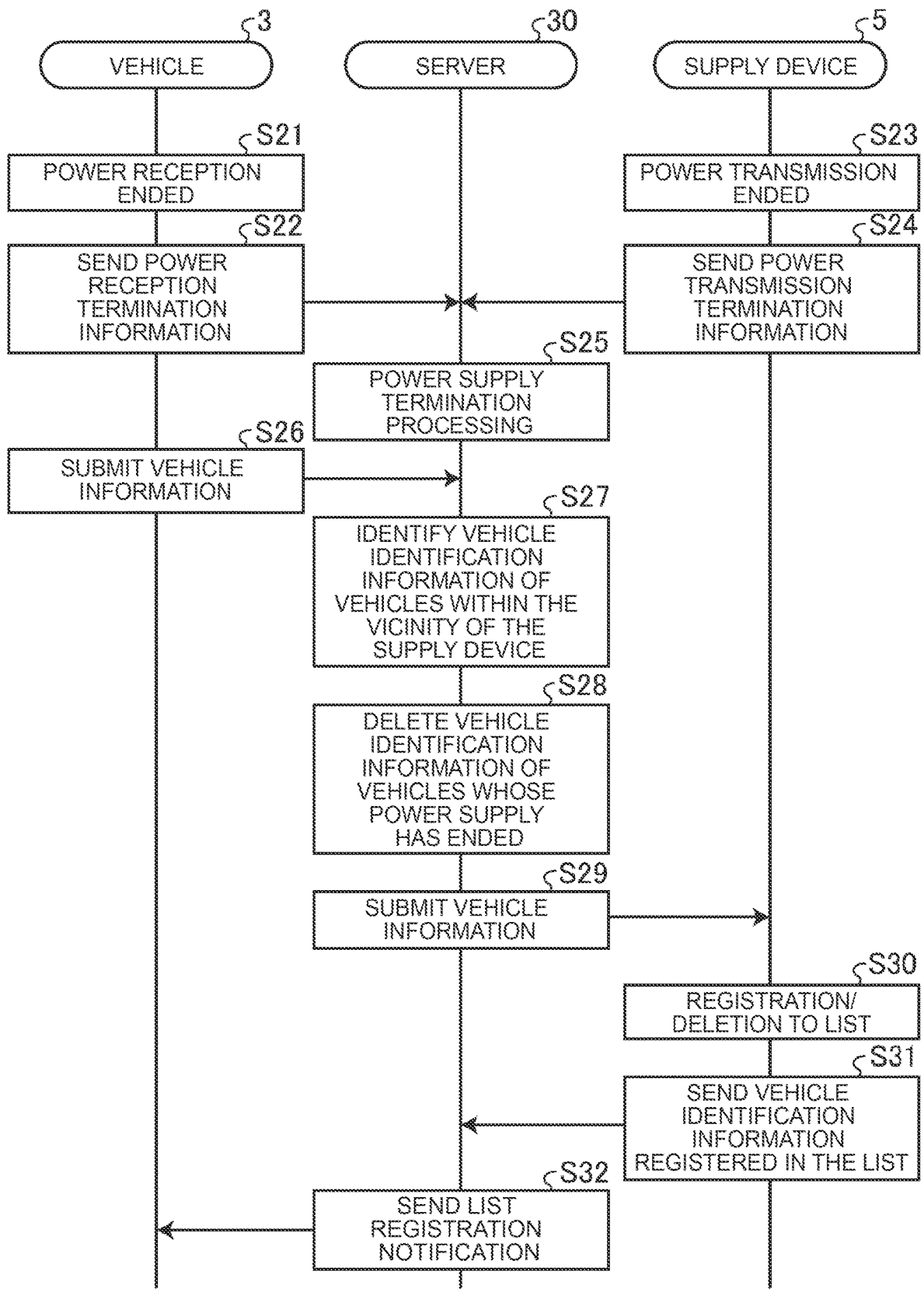
FIG. 8 is a sequence diagram showing the operation after the power supply from the supply device to the vehicle while running is completed.

The power transfer terminated A170 will be explained. In this state, the supply device 5 reduces the transmitted power to zero and retains or uploads power transmission result data such as total transmitted power, power transmission efficiency, and failure history. Each piece of data is tagged with vehicle identification information. Finally, the supply device 5 deletes the vehicle identification information of the vehicle 3 that has passed through the D-WPT lane. Thereby, the supply device 5 can prepare for pairing and power transmission to be performed later on to other vehicles. FIG. 8 shows the processing sequence for the power transfer terminated A170.

FIG. 8 is a sequence diagram showing the operation after the power supply from the supply device to the vehicle while running is completed. When the power receiving device 20 of the vehicle 3 finishes receiving power from the supply device 5 (S21), the vehicle 3 transmits power reception end information to the server 30 (S22). In S22, power reception end information is transmitted from the third communication device 340 of the vehicle 3. The power reception end information includes, as information regarding power reception from the supply device 5, vehicle identification information of the vehicle 3, received power from the supply device 5, charging efficiency, and abnormality detection results, for example.

The supply device 5 ends power transmission to the vehicle 3 when the process of S21 is performed (S23). The processing in S21 and the processing in S23 may or may not be performed simultaneously. When the process of S23 is executed, the supply device 5 transmits power transmission end information to the server 30 (S24). In S24, power transmission end information is transmitted from the first communication device 120 of the supply device 5.

When the server 30 receives the power reception end information from the vehicle 3 and the power transmission end information from the supply device 5, it performs a power supply end process to end the power supply from the supply device 5 to the vehicle 3 (S25). In the power supply termination process, based on the power reception termination information and the power transmission termination information, a process of calculating the amount of power supplied from the supply device 5 to the vehicle 3 and a process of charging the user of the vehicle 3 based on the calculated amount of supplied power are performed.

Furthermore, the vehicle 3 transmits vehicle information to the server 30 regardless of the power supply termination process (S26). In S26, vehicle information is transmitted from the third communication device 340 of the vehicle 3.

When the server 30 receives the vehicle information from the vehicle 3 after performing the power supply termination process, the server 30 specifies the vehicle identification information of the vehicle 3 located within the vicinity of each supply device 5 based on the vehicle information (S27).

Then, if the power supply termination process for a certain vehicle 3 has already been performed in a certain supply device 5, the server 30 uses the vehicle identification information of the vehicle 3 in the vicinity area of this supply device 5 specified in the process of S27, the vehicle identification information of the vehicle 3 for which the power supply termination process has already been performed is deleted (S28).

Thereafter, the server 30 transmits to each supply device 5 the vehicle information linked to the vehicle identification information that has not been deleted in the process of S28, among the vehicle identification information of the vehicle 3 identified as being located in the vicinity area of each supply device 5 (S29).

After the vehicle information is transmitted to each supply device 5 in the process of S29, when the supply device 5 receives the vehicle information from the server 30, the supply device 5 registers and deletes the vehicle identification information from the identification information list (S30). The process at S30 is similar to the process at S14 in FIG. 7. After that, the supply device 5 transmits the vehicle identification information registered in the identification information list to the server 30 (S31). The process at S31 is similar to the process at S15 in FIG. 7.

Then, upon receiving the vehicle identification information from the supply device 5, the server 30 transmits a list registration notification to the vehicle 3 corresponding to the vehicle identification information registered in the identification information list (S32). The process at S32 is similar to the process at S16 in FIG. 7.

As a result, when the process shown in FIG. 8 is performed, the identification information list indicates that the vehicle is located within the vicinity of each supply device 5, the power supply from the supply device 5 has not ended, and the vehicle This means that vehicle identification information is registered for the vehicle 3 for which a request to erase the identification information has not been made. Then, if the vehicle identification information of the vehicle 3 is registered in the identification information list of any of the supply devices 5, the vehicle 3 receives the list registration notification. Therefore, by receiving the list registration notification, vehicle ECU 330 can determine whether the own vehicle is registered in any of the supply devices 5. When the vehicle 3 moves out of the vicinity of the supply device 5, the vehicle identification information of the vehicle 3 is deleted from the identification information list of the supply device 5.

Return to FIG. 6. Further, at the power transfer terminated A170, the power receiving device 20 does not need to do anything to reduce the transmitted power to zero. The P2PS interface is kept active when the vehicle 3 is in the D-WPT lane, and the state of the power receiving device 20 automatically transitions to pairing for power transmission from the next primary device 13. As shown in the transition line shown in FIG. 6, the state transitions from the power transfer terminated A170 to pairing and alignment check A130. As shown in FIG. 6, when predetermined transition conditions are met, a transition from magnetic coupling check A140 to pairing and alignment check A130, and a transition from Perform Power Transfer A150 to pairing and alignment check A130 are possible. Pairing may be performed for each of the plurality of primary coils 11 individually, or may be performed at a representative point by bundling the plurality of primary coils 11.

Then, the D-WPT service session A70 is prohibited if there is no D-WPT request from the vehicle ECU 330, or if a series of states from the communication setting and Request D-WPT service A60 to the power transfer terminated A170 are prohibited, a transition to Terminate D-WPT service session A80 occurs, and wide area wireless communication between the first communication device 120 and the third communication device 340 is stopped. For example, D-WPT shuts down when the state of charge in battery 320 is too high or when power receiving device 20 is too hot for continuous power transfer. Such unnecessary D-WPTs can be disabled by simply deactivating the P2PS interface. However, by stopping the wide area wireless communication, the power transmission ECU 110 can release the memory occupied for the vehicle 3 without requiring D-WPT by terminating the established wide area wireless communication.

Furthermore, the D-WPT service session A70 is not limited to transitions like the transition line shown in FIG. 6. When the pairing and alignment check A130 and subsequent activities are completed in the D-WPT service session A70, if the conditions for the power transfer process to remain in the D-WPT service session A70 are met, no transition to the Terminate D-WPT service session A80 occurs, and transitions to compatibility check and service authentication A110. For example, if a predetermined transition condition is satisfied in the magnetic coupling check A140 state, the state can transition to compatibility check and service authentication A110.

Next, the processing executed by the control device will be explained. FIG. 9 is a flowchart showing the processing executed by the control device. Vehicle ECU 330 as a control device included in vehicle 3 determines whether vehicle 3 is being charged (S1). When the vehicle ECU 330 determines that the vehicle 3 is not being charged (S1: No), the vehicle ECU 330 shifts to a standby state in which the process of S1 is repeated at predetermined time intervals.

When the vehicle ECU 330 determines that the vehicle 3 is being charged (S1: Yes), the vehicle ECU 330 acquires the amount of power received from the secondary coil 21 of the power receiving device 20 that the supply facility 2 has, and also acquires the amount of power received from the power transmitting device The amount of power transmitted from the primary coils 11 of 10 is acquired by wide area wireless communication (S2).

Next, vehicle ECU 330 calculates charging efficiency, which is calculated by dividing the amount of received power by the amount of transmitted power (S3).

Furthermore, vehicle ECU 330 determines whether or equal to a threshold value (S4).

When vehicle ECU 330 determines that the charging efficiency is not below the threshold value (S4: No), the series of processes ends.

On the other hand, when the vehicle ECU 330 determines that the charging efficiency is less than or equal to the threshold value (S4: Yes), the vehicle ECU 330 optimizes the running position of the vehicle 3 in the width direction (S5).

Next, a method for vehicle ECU 330 to optimize the running position of vehicle 3 in the width direction will be described. Vehicle ECU 330 has a function of supporting automatic driving of vehicle 3. Then, the vehicle ECU 330 outputs information for changing the running position of the vehicle 3 in the width direction, and corrects the running position in the width direction according to the change in the power transmission state when changing the running position in the width direction. The information is, for example, a control signal for automatically changing the traveling position in the width direction.

FIG. 10 is a flowchart showing a process for optimizing the running position of the vehicle in the width direction. First, the vehicle ECU 330 shifts the traveling position of the vehicle 3 in the width direction to the right by automatic operation (S51). Note that the vehicle ECU 330 may shift the running position of the vehicle 3 in the width direction to the left by automatic operation, but in this case, it is necessary to switch the right and left positions in subsequent processing as well.

Subsequently, vehicle ECU 330 determines whether the charging efficiency increases when the traveling position in the width direction is shifted to the right (S52).

When the vehicle ECU 330 determines that the charging efficiency has increased (S52: Yes), the vehicle ECU 330 further shifts the traveling position of the vehicle 3 in the width direction to the right by automatic operation (S53).

After that, vehicle ECU 330 again determines whether the charging efficiency has increased when the traveling position in the width direction is shifted to the right (S54).

If vehicle ECU 330 determines that the charging efficiency has not increased (S54: No), the series of processes ends.

On the other hand, when vehicle ECU 330 determines that the charging efficiency has increased (S54: Yes), the process returns to S53 and continues the process.

In S52, when the vehicle ECU 330 determines that the charging efficiency has not increased (S52: No), the vehicle ECU 330 automatically shifts the running position of the vehicle 3 in the width direction to the left (S55).

After that, vehicle ECU 330 determines whether the charging efficiency has increased when the traveling position in the width direction is shifted to the left (S56).

If vehicle ECU 330 determines that the charging efficiency has not increased (S56: No), the series of processes ends.

On the other hand, when vehicle ECU 330 determines that the charging efficiency has increased (S56: Yes), the process returns to S55 and continues the process.

As described above, the vehicle ECU 330 outputs a control signal to change the running position of the vehicle 3 in the width direction, and corrects the running position in the width direction according to the change in the power transmission state at that time. As a result, even if the charging efficiency characteristics of the primary coil 11 and the secondary coil 21 in the width direction of the vehicle 3 are symmetrical, the traveling position in the width direction can be corrected.

Note that the charging efficiency also changes depending on the positional relationship between the primary coil 11 and the secondary coil 21 in the traveling direction of the vehicle 3. When the change characteristics of the charging efficiency in the traveling direction of the vehicle 3 are known, the vehicle ECU 330 may subtract the influence caused by the vehicle 3 traveling in the traveling direction from the change in the charging efficiency of the vehicle 3, and extract the change in the charging efficiency in the width direction of the vehicle 3.

Furthermore, while the vehicle 3 is running, the speed of movement of the vehicle 3 in the width direction is sufficiently smaller than the speed of movement of the vehicle 3 in the direction of travel. Therefore, by using this difference in speed, the component with a short time constant of the change in charging efficiency may be removed as being due to the influence of the traveling direction, and the component with a large time constant may be extracted as a component in the width direction.

Further, as a change in the power transmission state, the running position of the vehicle 3 in the width direction may be corrected using an index other than charging efficiency. Specifically, the vehicle ECU 330 may correct the running position of the vehicle 3 in the width direction based on the success or failure of power reception, the transition of the received power, and the like.

Further, although an example has been described in which the information output by the vehicle ECU 330 is a control signal for changing the traveling position in the width direction by automatic driving, the information is not limited to this. For example, the information output by the vehicle ECU 330 may be a control signal that instructs the driver of the vehicle 3 to change the traveling position of the vehicle 3 in the width direction. In this case, the driving position in the width direction can be corrected by the driver manually operating the vehicle 3 according to the instructions using this control signal. Note that instructions using control signals may be displayed on various monitors, or may be output as audio.

Further, the vehicle ECU 330 corrects the running position of the vehicle 3 in the width direction by automatic operation, but if the vehicle 3 has a drive unit that can change the position of the secondary coil 21, by driving this drive unit, the traveling position of the vehicle 3 in the width direction may be corrected.

Further advantages and modifications can be easily deduced by those skilled in the art. The broader aspects of the disclosure are not limited to the specific details and representative embodiments shown and described above. Accordingly, various changes may be made without departing from the spirit or scope of the general disclosure concept as defined by the appended claims and their equivalents.

What is claimed is:

1. A control device comprising a processor configured to:
   acquire first information indicating a first transmitted power amount and a first received power amount in a wireless power transmission system that transmits power from a primary coil to a vehicle that is moving in a noncontact manner, the first transmitted power amount being an amount of power transmitted from the primary coil, the first received power amount being an amount of power received by a secondary coil, the primary coil being included in a supply facility, and the vehicle including the secondary coil;
   calculate a first charging efficiency based on the first information:
   determine whether the calculated first charging efficiency is below a threshold efficiency;
   when the first charging efficiency is below the threshold efficiency, shift the vehicle rightwards in left-right direction of the vehicle;
   acquire second information indicating a second transmitted power amount and a second received power amount, and calculate a second charging efficiency based on the second information, the second transmitted power amount being an amount of power transmitted from the primary coil, and the second received power amount being an amount of power received by secondary coil;
   calculate a difference between the first charging efficiency and the second charging efficiency, and extract a component with a time constant larger than a threshold time constant from the difference;
   determine whether the charging efficiency is increased by the shift based on the extracted component;
   when the charging efficiency is increased, further shift the vehicle rightwards in the left-right direction of the vehicle; and
   when the charging efficiency is not increased, shift the vehicle leftwards in the left-right direction of the vehicle.

2. The control device according to claim 1, wherein the primary coil is configured to wirelessly transmit power to the secondary coil by magnetic field resonance.

3. The control device according to claim 2, wherein the primary coil is embedded within road.

4. The control device according to claim 3, wherein:
the vehicle includes camera that is configured to capture images of the road; and the processor is configured to acquire the captured images from the camera,
determine whether an obstacle is on the primary coil based on the captured images, and when the obstacle is detected on the primary coil, stop transmitting the power from the primary coil to the secondary coil.

5. A wireless power transmission system comprising:
a supply facility including a primary coil; and
a vehicle that is moving and that includes a secondary coil and a processor, wherein
the primary coil is configured to transmit power to the secondary coil in a noncontact manner, and
the processor is configured to
acquire first information indicating a first transmitted power amount and a first received power amount, the first transmitted power amount being an amount of power transmitted from the primary coil, the first received power amount being an amount of power received by the secondary coil,
calculate a first charging efficiency based on the first information,
determine whether the calculated first charging efficiency is below a threshold efficiency,
when the first charging efficiency is below the threshold efficiency, shift the vehicle rightwards in left-right direction of the vehicle,
acquire second information indicating a second transmitted power amount and a second received power amount, and calculate a second charging efficiency based on the second information, the second transmitted power amount being an amount of power transmitted from the primary coil, the second received power amount being an amount of power received by the secondary coil,
calculate a difference between the first charging efficiency and the second charging efficiency, and extract a component with a time constant larger than a threshold time constant from the difference,
determine whether the charging efficiency is increased by the shift based on the extracted component,
when the charging efficiency is increased, shift the vehicle rightwards in the left-right direction of the vehicle, and
when the charging efficiency is not increased, shift the vehicle leftwards in the left-right direction of the vehicle.

6. The wireless power transmission system according to claim 5, wherein the primary coil is configured to wirelessly transmit power to the secondary coil by magnetic field resonance.

7. The wireless power transmission system according to claim 6, wherein the primary coil is embedded within road.

8. The wireless power transmission system according to claim 7, wherein:
the vehicle includes camera that is configured to capture images of the road; and the processor is configured to acquire the captured images from the camera,
determine whether an obstacle is on the primary coil based on the captured images, and
when the obstacle is detected on the primary coil, stop transmitting the power from the primary coil to the secondary coil.

* * * * *